Jan. 11, 1955
D. A. McLEOD
DEBARKING TOOL
2,699,189
Filed Oct. 5, 1951
3 Sheets-Sheet 1
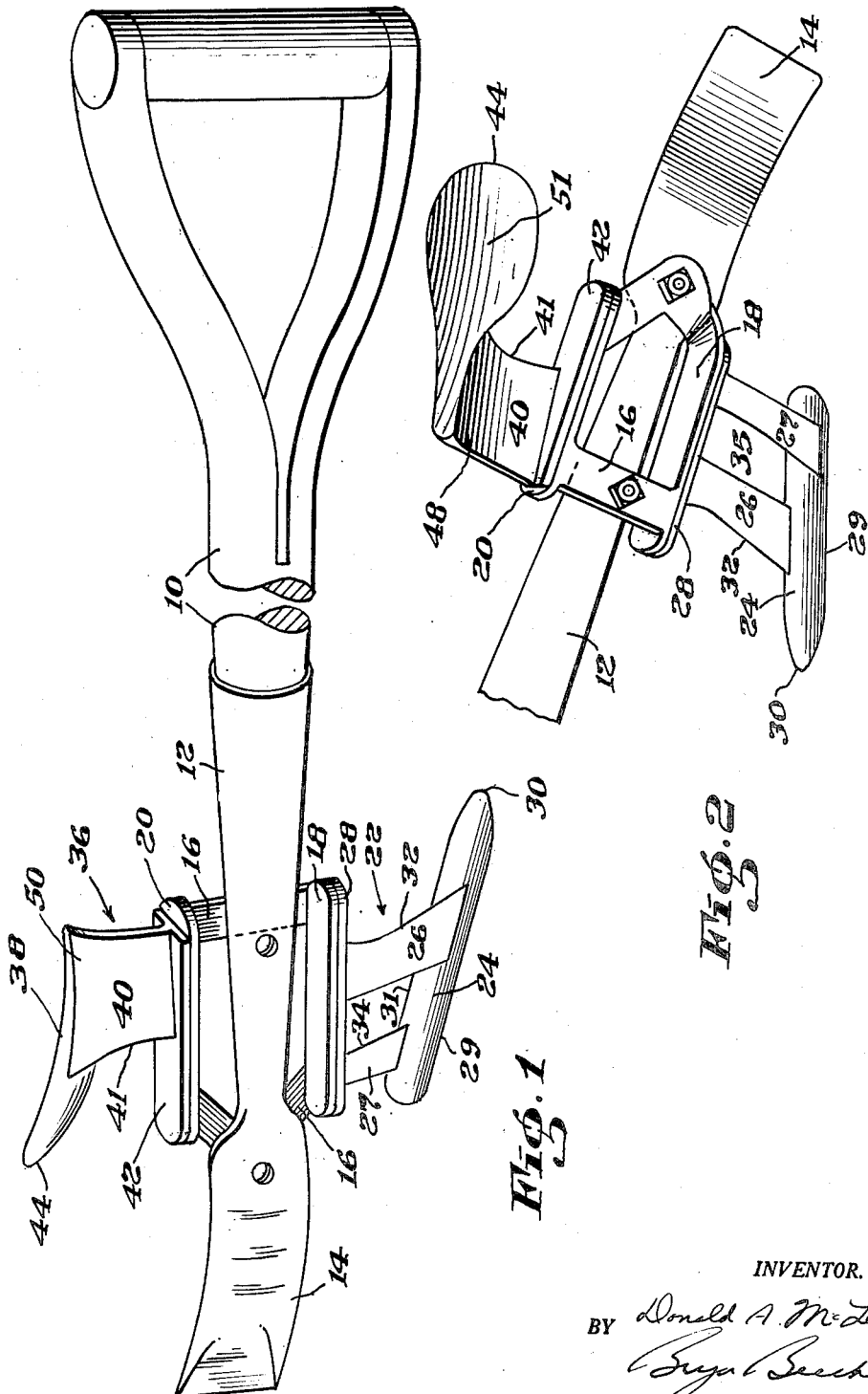
INVENTOR.
BY Donald A. McLeod
ATTORNEY Jan. 11, 1955  D. A. McLEOD  2,699,189
DEBARKING TOOL
Filed Oct. 5, 1951 3 Sheets-Sheet 2
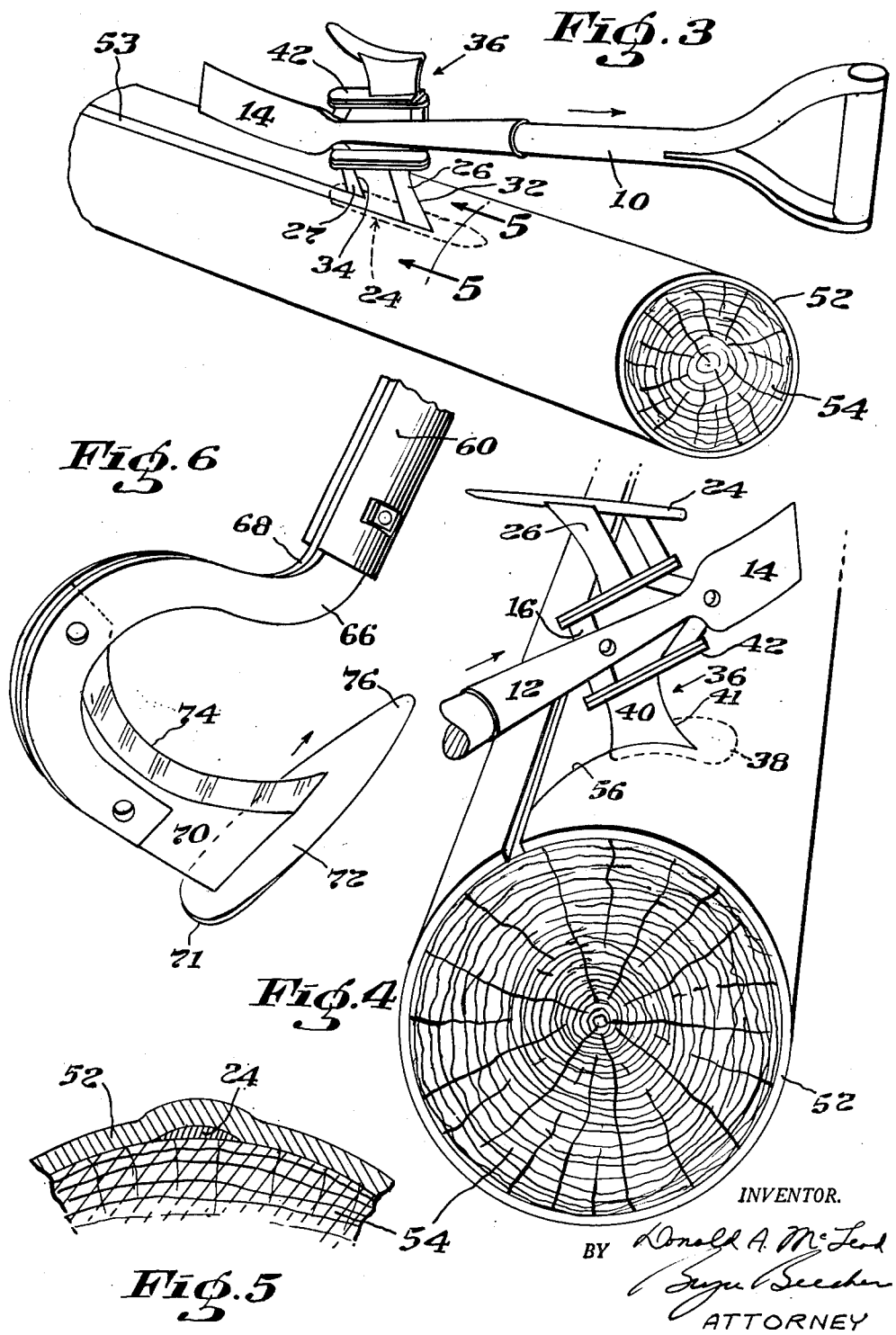

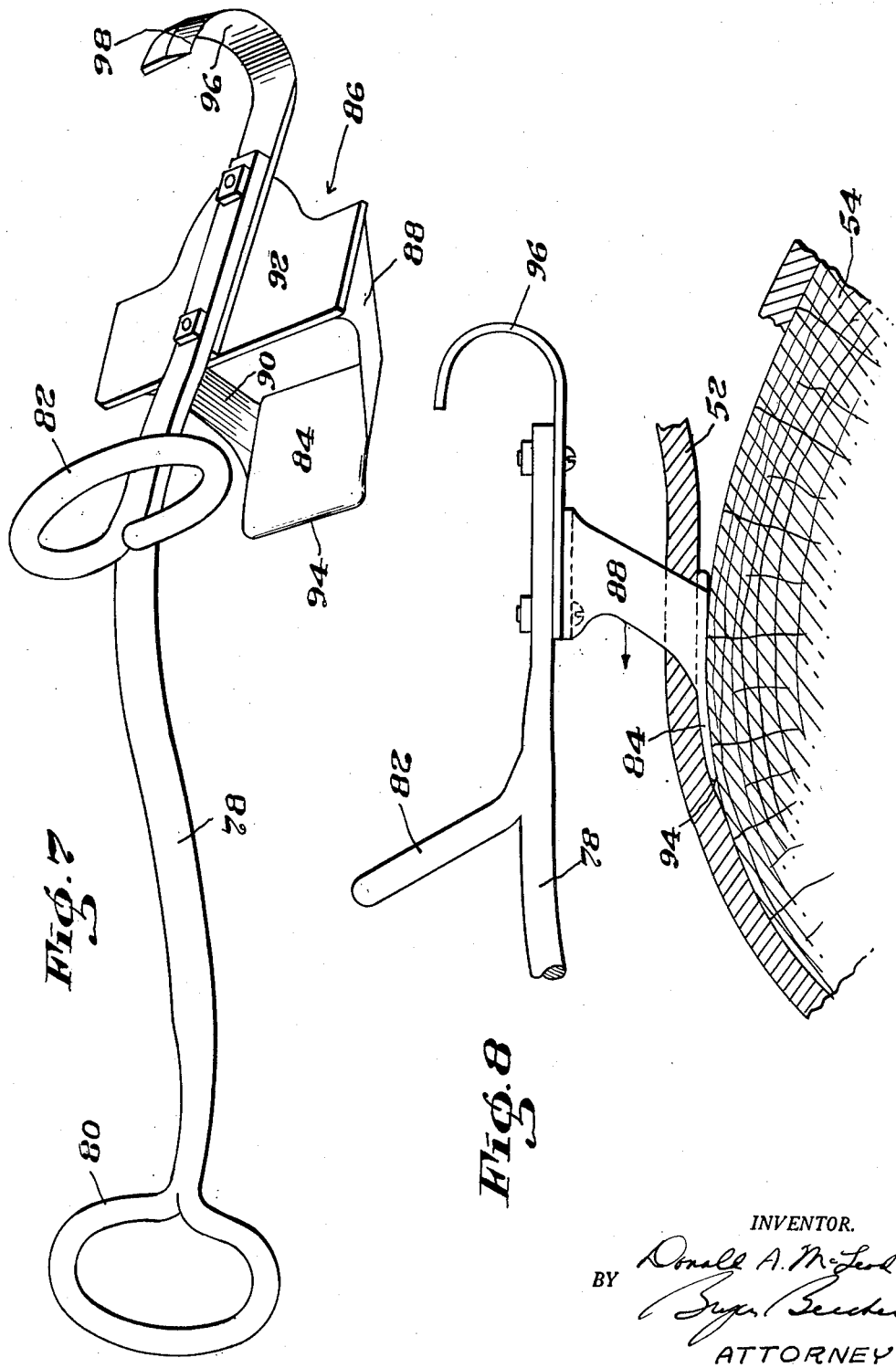

United States Patent Office 2,699,189
Patented Jan. 11, 1955

2,699,189

DEBARKING TOOL

Donald A. McLeod, St. Stephen, New Brunswick, Canada

Application October 5, 1951, Serial No. 249,827

12 Claims. (Cl. 144—208)

My invention concerns tools for de-barking trees, particularly softwood trees as spruce, fir and hemlock.

While tools have been proposed heretofore for the indicated purpose, and while the managements of various lumbering enterprises have urged the use of some of these on the men in the woods, none has been generally accepted by the men. My tools, on the other hand, have been found satisfactory by both management and the woodsmen, who are now finally willing to discard the axe, universally recognized by supervising lumbermen as an awkward and generally inadequate tool for de-barking purposes.

A de-barking tool conforming to my invention is characterized in that it comprises a shoe element arcuated in general correspondence with the periphery of the tree member to be de-barked (having regard to the course of travel of the element in use), the forward end of such element being enterable in the manner of a wedge between the body of a tree member and the bark, and a blade element, positioned rearwardly of such end of the shoe element, having a cutting edge extending generally upwardly from the back of the shoe element and arranged to cut the tensioned bark as the shoe element is slipped along under the bark over the body of the tree member.

Certain of the tools embraced by my invention are designed for use particularly on felled trees, while others are constructed for use on standing timber. Recently, much interest has been shown in a chemical de-barking process wherein a substance which interferes with tree metabolism, ultimately causing the bark to fall off, is applied by painting or spraying a stripe around the trunk of the standing tree following removal of the bark from the area receiving the treatment. The principle on which my invention is founded can be applied with marked advantage in the construction of a tool for removing the ring or circular ribbon of mark preparatory to the painting, and I have so applied it with pronounced success.

In the accompanying drawings illustrating preferred embodiments of my invention:

Fig. 1 is a perspective view of a tool designed especially for the de-barking of fir, spruce and poplar logs, the view favoring the back side of the tool;

Fig. 2 is a fragmentary perspective view of the working portion of the tool of Fig. 1, the view in this instance favoring the front of the tool;

Figs. 3, 4 and 5 illustrate the operation of the tool of Fig. 1;

Fig. 6 is a perspective view of the working portion of a tool particularly useful in the de-barking of hemlock logs;

Fig. 7 is a perspective view of a form of tool adapted for use in the chemical de-barking process generally described above; and Fig. 8 is a plan illustrating the latter tool in operation.

Referring first to Fig. 1, the numeral 10 denotes a handle member having joined thereto an encircling shank 12. Integral with the shank is a spatula-like, longitudinally-bowed portion 14, the function of which will be later explained.

A framework 16, secured to the shank 12, carries a pair of flanges 18 and 20 oppositely and laterally disposed with relation to the shank. Fastened to the flange 18 by welding, bolting or in any other suitable way is a member 22 comprising a shoe element 24 and a pair of blades 26, 27, which extend between the shoe element and a flange 28 complementary to the flange 18.

Shoe element 24 is transversely bowed or arcuated over its length in general correspondence with the tree member to be de-barked, has tapered side edges 29, 31 and a tapered and somewhat pointed end 30 extending forwardly of the longer blade 26, which in turn is disposed forwardly of the shorter blade 27. As will be seen from Fig. 5, by reason chiefly of the tapering toward the side edges, the arc of the upper surface of the shoe element 24 is somewhat more abrupt than the arc of the lower surface thereof.

The line of each of the cutting edges 32 and 34 of the blades 26 and 27, respectively, is slightly curved, the degree of curvature being somewhat greater in the instance of edge 32. The extent of the lateral offsetting 35 (see Fig. 2) of the blades is determined by the width of the ribbon of bark it is desired to remove on use of the tool.

Secured to the flange 20 through a complementary flange 42 is a second shoe-bearing member 36, the shoe element 38 in this case being generally spoon-shaped, with tapered edges. Whereas the shoe element 24 is designed to be pulled over the length of a log (with the base of the shoe riding on the surface of the body of the log under the bark), spoon 38 is formed to be pushed generally circumferentially about the log (Fig. 4) but somewhat angularly so that the cut made by the honed edge 41 of the blade 40 is not directly across the grain of the bark, but follows a helical line. With this in mind the very peculiar shape of the member 36 will be more readily understood.

The cutting edge 41 will be noted as positioned rearwardly of the toe 44 of the shoe element 38 and as being inwardly curved (Fig. 2). Also it will be observed that the body of the blade, incident to the proper disposition of the shoe, presents a generally concave surface at 48 and a generally convex surface at 50.

Like the underside of the shoe 24, the underside 51 of the shoe element 38 is arcuated or bowed as determined by the contour of the surfaces of the body of the tree member contacted thereby.

Although the operations performed with the tool (Figs. 1–5) are probably already apparent, they will now be described: With the shoe element 24 held down, the tapered end 30 is entered between the bark 52 and the body 54 of the log at the end of the log. This being accomplished, the tool, as before indicated, is pulled over the length of the log (Fig. 3) to produce a longitudinal cut 53 of a width determined by the width of the lateral offsetting 35 between the two blades 26 and 27. The cutting of the bark is surprisingly easy due to the tensioning thereof by the shoe element before the blade edges 32 and 34 reach the uncut bark. This tensioning is illustrated particularly by Fig. 5, wherein the bark 52 will be noted as raised by the shoe with consequent stretching of the bark over the arc of the shoe. Such action is similar to that obtaining when an edge of a piece of cloth or paper, for example, is held taut to facilitate the initiation of a cut at such edge.

With the longitudinal cut made, the tool is turned about so that, by using the member 36 (see Fig. 4), a series of angular circumferential cuts 56 may be made at either side of the longitudinal cut. The number of these cuts is largely discretionary with the woodsmen, but usually they are made at intervals of four or five feet. Here again, just as in the case of member 22, the cutting proceeds with elevation of the bark above the arc of the shoe and consequent tensioning of the bark ahead of the blade 40. Normally, the cuts made with the member 36 are carried only about one-third of the way around the log, on each side of the longitudinal cut. Once the cuts are made, the bark is removed from the log by means of the longitudinally-bowed spatula-shaped element 14, such element being applied, of course, with the convex side up. The element 14 of itself forms no part of my invention.

As before noted, the tool just described is particularly adapted for employment in the de-barking of spruce and fir. Hemlock has a thicker and much tougher bark, which is more tightly bonded to the tree, necessitating the use of somewhat larger tools. Fig. 6 shows the preferred form of tool for making a longitudinal cut over the length of a hemlock log. This tool will be seen as including a shank 60 securing a pair of flanges 66, 68, each of which has the general shape of a question mark. A single blade member 70, fastened between the flanges terminates in a shoe element 72 having essentially the same shape as the shoe 24 in the construction previously described, except for the edges 71 rearwardly of the cutting edge 74 of the blade, which are left unfeathered. The cutting edge of the blade member will be seen as following a curved line and as positioned well back of the tip 76 of the shoe.

Referring now to Figs. 7 and 8, to take a circular ribbon of bark from the trunk of a standing tree, as required according to the chemical de-barking method, I use a tool, preferably formed entirely of metal, having a curved handle 78 including two handholds 80 and 82, the latter being positioned near the working end of the tool. The curvature of the handle is such that the handhold 80 is substantially in the plane of the shoe portion 84 of the shoe-bearing member 86, which additionally comprises blades 88 and 90 spanned by a plate 92 through which the member is connected to the handle. Blades 88 and 90 connect with the shoe at the side edges thereof well back of the leading edge 94 of the shoe. These blades extend outwardly as well as upwardly of the shoe so that the cuts are not made directly across the grain of the bark. A third blade member 96 at the end of the handle has a cutting edge 98. This blade, which is shaped as a hook, is used to break the bark in a generally vertical direction so as to facilitate entry of the leading edge of the shoe under the bark at the beginning of the de-barking operation.

Shoe 84 is longitudinally bowed to accord with the circumferential surface of the tree (Fig. 8) and the cutting proceeds, as in the case of the other tools illustrated, with tensioning of the bark 52 ahead of the blades.

It is understood that the invention will not be considered as restricted to the precise details of construction indicated in the drawings, since substantial changes and modifications may obviously be made without departing from the scope of the invention or sacrificing the advantages derived from its use.

I claim:

1. A de-barking tool comprising a shoe element arcuated in general correspondence with the periphery of a tree member to be de-barked, the forward end of such element being enterable between the body of the tree member and the bark to tension the bark, and a blade element extending upwardly from the convex face of said shoe element rearwardly of said end and having a forwardly directed cutting edge sloping generally upwardly and rearwardly from a location rearwardly of the forward end of the shoe element and arranged to cut the tensioned bark as the shoe element is slipped along under the bark over the body of the tree member.

2. A de-barking tool comprising an elongated shoe element bowed transversely over its length, the forward end of such element being enterable in the manner of a wedge between the body of a tree member and the bark to tension the bark, and a blade element extending upwardly from the convex face of said shoe element rearwardly of said end and having a forwardly directed cutting edge sloping generally upwardly and rearwardly from a location rearwardly of the forward end of the shoe element and arranged to cut the tensioned bark as the shoe element is slipped along longitudinally of the tree member under the bark.

3. A de-barking tool comprising a bowed shoe element, the forward end of such element being enterable in the manner of a wedge between the body of a tree member and the bark to tension the bark, and a pair of transversely spaced blades extending from the convex face of said shoe element and having forwardly directed cutting edges sloping generally upwardly and rearwardly from a location rearwardly of the forward end of said shoe element.

4. A de-barking tool comprising an elongated shoe element transversely bowed over its length, the forward end of such element being enterable in the manner of a wedge between the body of a tree member and the bark to tension the bark, and a pair of blade elements projecting from the convex face of said shoe element and having forwardly directed cutting edges sloping generally upwardly and rearwardly from a location rearwardly of the forward end of the shoe element and arranged to cut the tensioned bark as the shoe element is slipped along longitudinally of the tree member under the bark, one of said blades being located rearwardly of the other and being laterally offset from the other a distance determined by the width of bark it is desired to remove by means of the tool.

5. A de-barking tool comprising a shoe element, one end of which is enterable in the manner of a wedge between the body of a tree member and the bark to tension the bark, said element having a generally convex upper surface and a generally concave lower surface meeting at a tapered edge, and a blade member projecting from the convex face of said shoe element and having a forwardly directed cutting edge sloping generally upwardly and rearwardly from a position rearwardly of the forward end of the shoe element, said element and said blade being otherwise so formed and related that the cut made by the blade in use of the tool follows a helical line.

6. A de-barking tool comprising a shoe element arcuated in general correspondence with the periphery of a tree member to be de-barked and a blade element having a forwardly directed cutting edge sloping generally upwardly and rearwardly from the convex face of the shoe element mediate the ends thereof, that portion of the shoe element forward of the cutting edge of the blade member being tapered to the end that the shoe element is readily enterable between the body of the tree member and the bark, said tool being characterized in operation in that the bark is tensioned ahead of the blade element by the shoe element as the latter is slipped along under the bark over the body of the tree member.

7. A de-barking tool comprising a longitudinally-bowed shoe element mounting a pair of blades having cutting edges sloping generally upwardly and rearwardly from the opposed sides of the shoe element rearwardly of the forward end thereof, such end of the shoe element being enterable in the manner of a wedge between the body of a tree member and the bark to tension the bark, the space between the blades determining the width of bark taken on use of the tool.

8. A de-barking tool comprising a longitudinally-bowed shoe element tapered in thickness toward its forward end, and a pair of blades mounted on the convex face of said shoe at the opposing lateral edges thereof rearwardly of said forward end and extending generally upwardly and divergently outwardly therefrom, each said blade having a cutting edge sloping generally rearwardly from said shoe, the forward end of said shoe being enterable between the body of a tree and the bark to tension the bark in advance of its contact with said cutting edges.

9. A de-barking tool comprising a bowed shoe element having a tapered forward end enterable between the body of a tree and the bark to tension the bark, a blade mounted on the convex face of said shoe rearwardly of said forward end and inwardly from the lateral margins of said shoe, said blade having a forwardly directed cutting edge sloping generally upwardly and rearwardly from said shoe, and a handle secured to said tool and extending forwardly of the forward end of said shoe element in offset relation to said shoe element for drawing said tool through the bark.

10. A de-barking tool comprising a bowed shoe element having a tapered forward end enterable between the body of a tree and the bark to tension the bark, and a pair of blades mounted on the convex face of said shoe rearwardly of the forward end and inwardly from the lateral margins of said shoe, one of said blades being disposed rearwardly of the other and being laterally offset from the other by a distance equal to the width of the strip of bark it is desired to remove, each of said blades having a forwardly directed cutting edge sloping generally upwardly and rearwardly from the shoe.

11. A de-barking tool comprising a plate-like shoe element, a blade having a forwardly directed cutting edge extending upwardly from said shoe element from a location rearwardly of the forward end of said shoe element, and a handle secured to said tool and extending forwardly of said shoe element in off-set relation to said shoe element for drawing said tool through the bark, the forward end of said shoe element being enterable between the body of the tree and the bark to tension the bark in advance of its contact with said cutting edge.

12. A de-barking tool comprising a generally plate-like shoe element tapered in thickness toward its forward end, a pair of blades having forwardly directed cutting edges mounted on said shoe element at the opposing lateral edges thereof rearwardly of said forward end and extending generally upwardly and divergently outwardly therefrom, the forward end of said shoe element being enterable between the body of a tree and the bark to tension the bark in advance of its contact with said cutting edges, and a handle secured to said tool extending forwardly of said shoe element in offset relation thereto and terminating in a portion lying substantially in the plane of said shoe element.

References Cited in the file of this patent

UNITED STATES PATENTS

| Number | Name | Date |
|---|---|---|
| 875,391 | Tinsley | Dec. 31, 1907 |
| 1,617,953 | Kero | Feb. 15, 1927 |
| 1,627,901 | Hills | May 10, 1927 |
| 2,364,973 | Hansen | Dec. 12, 1944 |
| 2,520,274 | Cline | Aug. 29, 1950 |

FOREIGN PATENTS

| Number | Country | Date |
|---|---|---|
| 7,510 | Great Britain | Mar. 28, 1912 |
| 729,989 | Germany | Jan. 6, 1943 |